Patented Apr. 19, 1949

2,467,845

UNITED STATES PATENT OFFICE 2,467,845

DIOLEFIN EXTRACTION

Charles E. Morrell, Westfield, and Miller W. Swaney, Cranford, N. J., assignors to Standard Oil Development Company, a corporation of Delaware No Drawing. Application May 12, 1945, Serial No. 593,538

7 Claims. (Cl. 260—681.5)

This invention relates to improvements in the separation and purification of a diolefin, and particularly to the separation of acetylenes found present in a mixture of the diolefin and other hydrocarbons, both before and after they have been separated from the other hydrocarbons, such as mono-olefins and paraffins.

In the commercial production of a diolelefin it is often necessary to preferentially extract this diolefin from mixtures of saturated and unsaturated hydrocarbons having the same number of carbon atoms to the molecule and which contain, in addition to the diolefin and olefins, traces of acetylenic compounds. Cracked hydrocarbon cuts, boiling in the $C_4$ to $C_6$ range, have been found to contain various types of acetylenes, i. e., ethyl acetylene, n-propyl acetylene, branched chain acetylenes, such as isopropyl acetylene, isobutyl acetylene, vinyl acetylene, alkyl vinyl acetylenes, etc. It is well known that all alpha-acetylenes, R—C≡CH, form explosive acetylides with cuprous salts. Ethyl and vinyl acetylene, for example, form yellow solid copper acetylides which explode (when dry) on being subjected to a shock or heated. Consequently, in extraction of a diolefin from an acetylene-containing hydrocarbon cut of the same number of carbon atoms to the molecule, using cuprous salt solutions, explosive copper acetylides tend to be precipitated at the point of contact between copper solution and hydrocarbon phase. Even in some of the ammonia- and amine-cuprous complex solutions there is constant danger of copper acetylide precipitation.

Olefins and diolefins react with cuprous ions to form complexes. In acidic solutions (pH 6 or below) these cuprous diolefin complexes are not very soluble and tend to largely precipitate. If the amine-cuprous solutions are even slightly basic (pH 7–8), however, the diolefin copper complexes remain dissolved. Thus an ammoniacal cuprous acetate solution of low amine-cuprous ratio and of pH of about 8, or a mono-ethanol amine cuprous chloride solution of pH 7 or 8 absorbs large quantities of the diolefin with no precipitation of the diolefin copper complexes. Nevertheless, when an acetylene-containing hydrocarbon cut is contacted with such a composition, for example, an ammoniacal cuprous acetate solution of 2-3 molar copper content, 7-8 molar ammonium acetate content, and 2-3 molar free ammonia content, and having a pH of about 8, yellow explosive solids are formed. Consequently, in the extraction of a diolefin from an acetylene-containing hydrocarbon cut, using an ammoniacal cuprous acetate solution of high acetate and low ammonia contents, much trouble is encountered with copper acetylide precipitation in the extraction. The term "free ammonia" refers to the amount present in addition to that required to combine with the acetate radical.

U. S. patent application, Serial No. 453,804, filed August 6, 1942, for Charles E. Morrell and Miller W. Swaney, now Patent 2,384,329 of which this present application is a continuation-in-part, discloses a process in which a diolefin is separated and segregated. According to this application, a hydrocarbon mixture containing a diolefin, such as butadiene, and one or more acetylenes, is treated with a cuprous salt solution containing at least 2 mols per liter of copper, and at least 0.5 mol per liter of ammonia in excess of that required to solubilize the cuprous hydroxide present in dissolved form to separate from the hydrocarbon mixture both the diolefin and acetylene. The resulting cuprous salt solution may then be heated to polymerize the acetylene and recover overhead butadiene substantially free of acetylene compounds.

From a stove-cracked hydrocarbon cut having the same number of carbon atoms to the molecule, i. e., having a range of 4 to 6 carbon atoms to the molecule, a diolefin, for example, isoprene, can be readily extracted by the use of aqueous acetone. The isoprene obtained by this process contains about 95% to 99% of isoprene and about 1% to 2% of alpha-acetylenes. The alpha-acetylenes must be separated from the isoprene prior to its use as a polymerization feed stock, and where isoprene is used as a chemical intermediate. The separation of the alpha-acetylenes may be made before the isoprene, or other diolefin, is separated from the other hydrocarbons, or it may also be made after a concentrated diolefin, such as isoprene, is obtained.

An object of this invention is to separate a pure diolefin, such as isoprene, substantially free of acetylenes.

According to this invention it has been found that it is possible to use for this purpose a cuprous salt solution of about 1 to 4 copper molarity and containing concentrations of anions and solubilizing amines regulated so that acetylides are kept in solution.

Following is a list of 3 molar cuprous solutions, all prepared by completely saturating ammonium acetate-ammonia solutions of different compositions with cuprous oxide, $Cu_2O$:

| Solution Number | Cuprous Molarity | Ammonium Acetate Molarity | Free NH₃ Molarity | Total NH₃ Molarity |
|---|---|---|---|---|
| I | 3.0 | 8.0 | 3.0 | 11.0 |
| II | 3.0 | 7.0 | 3.25 | 10.25 |
| III | 3.0 | 6.0 | 3.50 | 9.50 |
| IV | 3.0 | 5.0 | 4.0 | 9.0 |
| V | 3.0 | 4.0 | 4.75 | 8.75 |

In this series of constant copper solutions the ammonium acetate-ammonia ratios are seen to vary several-fold, while the free ammonia-copper ratios also vary considerably. It is further possible to add considerable additional excesses of free ammonia to these solutions, for example, to prepare the following solvent:

| Solution Number | Cuprous Molarity | Ammonium Acetate Molarity | Free NH₃ Molarity | Total NH₃ Molarity |
|---|---|---|---|---|
| VI | 3.0 | 4.0 | 7.0–8.0 | 11–12 |

It has been discovered that the solubility of solid copper acetylides in solutions of high ammonia content is considerably greater than the solubilities in solutions of low ammonia content. This increased solubility is highly important from the standpoint of this invention in that it allows larger amounts of acetylenes to come in contact with a unit volume of solution without encountering acetylide precipitation.

In U. S. patent application, Serial No. 453,804 a process is revealed in which mixtures of a diolefin, such as butadiene, and acetylenes were contacted with a copper solution under such conditions that both the diolefin and the acetylenes were simultaneously absorbed in the solution. It was further shown that heating of a solution containing acetylenes and butadiene could be carried out so that the butadiene could be regenerated from this solution in a satisfactorily pure form, the acetylenes being at least in part simultaneously polymerized. In such operations it is generally desired that the ratio of copper solution to butadiene-containing hydrocarbon feed to an extraction system be dictated by the butadiene solubility, the ratio actually used being set so that substantially complete absorption of butadiene occurs. In operations of this sort it is desirable to maintain solution compositions so that the solubilities of both the diolefin and the acetylenes are as high as possible in order to minimize both the amount of solution necessary for the absorption of the butadiene and also the possibilities of encountering acetylide precipitation. Utility of copper salt solution in purifying diolefins, such as isoprene, piperylene, 2,3-dimethylbutadiene and the 2-methylpentadienes, is not entirely limited to this type of operation, however. Certain types of copper solutions, especially those in which the copper is solubilized by ammonia, do not exhibit as high capacities for absorbing these C₅ and C₆ diolefins as they do for butadiene. The solubilities of the corresponding C₅ and C₆ acetylenes are not appreciably reduced as compared to the C₄ acetylenes, however. Hence it is possible using such solutions, and especially when using those of such composition that the acetylides have high solubilities, to remove acetylenes from hydrocarbon mixtures containing these C₅ and C₆ diolefins without simultaneously dissolving very large quantities of the diolefins. It is also important, for reasons illustrated below, in this type of application, to use solutions having high solubilities for copper acetylides.

An isoprene-containing fraction which also contains 1% of acetylenes, and which would give immediate and abundant copper acetylide precipitation when contacted with a cuprous acetate solution of low ammonia content, when contacted with an ammoniacal copper solution of 3 molar copper content, 4 molar ammonium acetate and 7 molar ammonia contents in a ratio of 2 volumes of hydrocarbon to one volume of solution, does not give a copper acetylide precipitate. However, the hydrocarbon phase is found to contain substantially no acetylenes, and only small amounts of isoprene are dissolved in the copper salt solution.

A piperylene solution, in dilute or concentrated form, after being contacted with an ammoniacal copper solution, 3 molar cuprous content, 4 molar ammonium acetate and 7 molar ammonia content, in a volume sufficient to absorb all of the acetylenes, did not show a substantial loss of piperylene and was free of acetylenes.

The solubilities of methyl-, ethyl- and vinyl acetylene have been determined in a copper solution (3N.Cu⁺; 4N.Acetate; 10N.NH₃) in contact with the respective solid copper acetylides at approximately 80° F. An additional value for ethyl acetylene has been obtained at 142° F. The solubilities are as follows:

| Substance | Temp., °F. | Solubility | | |
|---|---|---|---|---|
| | | Gm. mols/ liter | Wt. Per cent | Vols. Gas/ Vol. Solution |
| Methyl acetylene | 78 | 0.36 | 1.2 | 8.1 |
| Ethyl acetylene | 83 | 0.32 | 1.4 | 7.2 |
| Do | 142 | 0.30 | 1.3 | 6.7 |
| Vinyl acetylene | 80 | 0.24 | 1.0 | 5.4 |

These solubilities are substantial even in comparison with the solubilities of olefins and diolefins.

The absorption properties of 3 different cuprous salt solutions for isoprene are summarized in the following table:

*Liquid phase extraction of isoprene from trimethylethylene with cuprous salt solutions*

| Copper Solution Employed | Percent Isoprene in C₅ Feed | Absorption Temp., °C. | Vols. Gaseous C₅/ Vol. Solution | Purity of Isoprene Product |
|---|---|---|---|---|
| Pyridine-Cuprous Sulfate (2 M) | 25 | 0 | 11.0 | 92.0 |
| Do | 100 | 0 | 16.4 | 100.0 |
| MEA-Cuprous Chloride (3.1 M) [1] | 25 | 5 | 6.6 | 81.0 |
| NH₃-Cuprous Acetate (3.4 M) | 25 | 5 | 1.6 | 78.0 |
| Do | 70 | 0 | 2.5 | 92.0 |

[1] MEA = monoethanolamine.

A hydrocarbon mixture containing isoprene and acetylene compounds may first be treated with a cuprous salt solution having at least 1 mol per liter of cuprous ion and an excess of an amine sufficient to solubilize any cuprous acetylide that may be formed. The amount of cuprous salt solution used is sufficient to dissolve all of the acetylene compounds present. An excess of the cuprous salt solution is avoided as the same cuprous salt solution will absorb some of the isoprene. The amount of cuprous salt solution is relatively small and the amount of isoprene absorbed will, therefore, be relatively small. The residual hydrocarbon mixture containing isoprene and substantially free of acetylenes may then be extracted with acetone, or some other appropriate solvent, to prepare an isoprene of about 99% purity. On the other hand, it is sometimes desirable to extract the isoprene first with aqueous acetone, or some other appropriate polar solvent, to obtain an isoprene of fairly high purity, 95% or higher. This isoprene ordinarily contains a large part of the acetylenes that were present in the original hydrocarbon mixture. The isoprene, partially purified in this manner, is then treated with a cuprous salt solution having at least 1 mol per liter of cuprous ion, an excess of amine and a pH value of 10 to 12. The amount of cuprous salt solution added to the extracted isoprene is only sufficient to absorb all of the acetylenes present. The acetylenes present are all extracted along with a relatively small quantity of the isoprene. As only the extraction of the acetylenes is desired, relatively high temperatures may be used in treating both the isoprene, partially purified by previous solvent extraction, and the crude isoprene which has not been previously so purified. Temperatures ranging from 70° to 150° F. may be used.

The cuprous salt solution, when separated with the acetylenes and small quantity of isoprene in solution, may be heated to polymerize the acetylenes or alternatively may be added to a stream of cuprous salt solution used in the separation of butadiene, either before the butadiene is expelled or after, then heated to polymerize the acetylenes and then separated from the polymers.

This same process may be used in the purification, by removal of acetylenes, of a diolefin having 6 carbon atoms to the molecule, such as methyl pentadienes-1,3, by using a cuprous salt solution containing 1.5 mols per liter of cuprous ion, 0.3 mol per liter of cupric ion, 12.5 mols per liter of methyl amine, and 6.2 mols per liter of acetate. The contacting of the solution may be carried out in the liquid phase at 0° C., and 2.5 volumes of gas per volume of solution is recovered. Any acetylenes present are recovered in the cuprous salt solution and, therefore, only sufficient cuprous salt solution is used to absorb the acetylene compounds, leaving the methyl pentadienes-1,3 unabsorbed. The separated cuprous salt solution may then be treated by subjecting to a higher temperature to polymerize the acetylenes or by incorporating in a cuprous salt solution that has been used to separate other diolefins and which is to be heated to polymerize the acetylene bodies.

It has been found, generally, that the solubility of acetylenes in a cuprous salt solution, having 3 mols per liter of cuprous ion, 11 mols per liter of an amine and 3.5–4.0 mols per liter of acetate, ranges from about 0.2 to 0.3 mol per liter.

We claim:

1. In a process of separating and segregating a $C_5$ to $C_6$ diolefin from a hydrocarbon mixture of said diolefin and of an alkyl alpha-acetylene, the steps which comprise contacting the hydrocarbon mixture at 70° F. to 150° F. with a cuprous salt solution of 1 to 4 copper molarity and containing higher molar concentrations of the cuprous salt anion and ammonia that keep copper acetylides formed from the acetylene in solution, restricting the amount of said cuprous salt solution contacted with the hydrocarbon mixture so as to dissolve not more than a small portion of the diolefin in dissolving all the acetylene by said solution from the hydrocarbon mixture, then separating the undissolved diolefin, thus freed of the acetylene, from the cuprous salt solution containing the acetylene in the form of dissolved copper acetylide.

2. In a process as described in claim 1, said hydrocarbon mixture of the $C_5$ to $C_6$ diolefin and alkyl alpha-acetylene being a mixture obtained by extraction with aqueous acetone from a mixture of hydrocarbons containing the diolefin, alkyl alpha-acetylene, mono-olefins and paraffins.

3. In a process as described in claim 1, the diolefin being isoprene.

4. In a process of separating and segregating isoprene from a hydrocarbon mixture of isoprene and 1% acetylenes, the steps which comprise contacting 2 volumes of the hydrocarbon mixture at 70° F. to 150° F. with 1 volume of an ammoniacal cuprous salt solution of 3 molar cuprous salt, 4 molar ammonium acetate, and 7 molar free ammonia contents, the concentration of the acetate anion and of ammonia being sufficient to keep copper acetylides formed from the acetylenes in solution and the amount of said cuprous salt solution contacted with the hydrocarbon mixture being sufficient to dissolve all the acetylenes while dissolving no more than a small portion of the isoprene, then separating the isoprene, thus freed of the acetylenes, from the cuprous salt solution containing the acetylenes in the form of dissolved copper acetylides.

5. In a process of separating and segregating a $C_5$ to $C_6$ diolefin from an alkyl alpha-acetylene in a hydrocarbon mixture thereof, the steps which comprise contacting said hydrocarbon mixture at 70° F. to 150° F. with a cuprous salt solution of 1 to 4 of cuprous salt molarity with sufficient higher molar concentrations of cuprous salt anion and amine present to keep copper acetylide formed from the acetylene in solution, restricting the amount of said cuprous salt solution contacted with the hydrocarbon mixture so as to dissolve not more than a small amount of the diolefin in dissolving all the acetylene from the hydrocarbon mixture, then separating the undissolved diolefin, thus freed of the acetylene, from the cuprous salt solution containing the acetylene dissolved in the form of copper acetylide.

6. In a process as described in claim 5, said diolefin being methylpentadiene-1,3.

7. In a process as described in claim 5, said diolefin being piperylene.

CHARLES E. MORRELL.
MILLER W. SWANEY.

REFERENCES CITED

The following references are of record in the file of this patent:

UNITED STATES PATENTS

| Number | Name | Date |
| --- | --- | --- |
| 1,771,350 | Ramage | July 22, 1930 |
| 2,230,274 | Soday | Feb. 4, 1941 |
| 2,370,809 | Morrell et al. | Mar. 6, 1945 |
| 2,384,329 | Morrell et al. | Sept. 4, 1945 |
| 2,401,896 | Asbury et al. | June 11, 1946 |